(12) United States Patent
Okajima et al.

(10) Patent No.: US 9,996,508 B2
(45) Date of Patent: Jun. 12, 2018

(54) INPUT ASSISTANCE DEVICE, INPUT ASSISTANCE METHOD AND STORAGE MEDIUM

(71) Applicant: NEC Solution Innovators, Ltd., Koto-ku, Tokyo (JP)

(72) Inventors: Yuzuru Okajima, Tokyo (JP); Kosuke Yamamoto, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 92 days.

(21) Appl. No.: 15/033,961

(22) PCT Filed: Nov. 18, 2014

(86) PCT No.: PCT/JP2014/005765
§ 371 (c)(1),
(2) Date: May 3, 2016

(87) PCT Pub. No.: WO2015/075920
PCT Pub. Date: May 28, 2015

(65) Prior Publication Data
US 2016/0283446 A1    Sep. 29, 2016

(30) Foreign Application Priority Data

Nov. 25, 2013  (JP) ................................. 2013-243128

(51) Int. Cl.
*G06F 17/22*       (2006.01)
*G06F 17/27*       (2006.01)
(Continued)

(52) U.S. Cl.
CPC ............ *G06F 17/2223* (2013.01); *G06F 3/02* (2013.01); *G06F 3/0237* (2013.01); *G06F 17/276* (2013.01)

(58) Field of Classification Search
None
See application file for complete search history.

(56) References Cited

U.S. PATENT DOCUMENTS 6,473,754 B1 * 10/2002 Matsubayashi ..... G06F 17/3061
2011/0197128 A1 *  8/2011 Assadollahi .......... G06F 3/0237
                                                          715/259

FOREIGN PATENT DOCUMENTS

JP    2002-149642 A    5/2002
JP    2003-296354 A   10/2003
(Continued)

OTHER PUBLICATIONS

International Search Report for PCT Application No. PCT/JP2014/005765, dated Jan. 6, 2015.
(Continued)

*Primary Examiner* — Nicholas J Lee
*Assistant Examiner* — Duane N Taylor, Jr.

(57) ABSTRACT

To provide an input assistance device, an input assistance method and a storage medium which can present a character string to be suggested to a user in consideration of a probability of being inputted first in a character string. An input assistance device is for assisting a user to input a character string, the device includes: a character string determining unit that determines a character string to be suggested relating to the inputted kana character string, in the case that a user inputs a kana character string by use of index structure, the index structure recording therein a word together with its kana-reading and the index structure indicating whether or not it is probable that the word is inputted first at a time of inputting a character string; and a suggested candidate presenting unit that presents the character string to be suggested, which is determined, as a suggested candidate.

17 Claims, 12 Drawing Sheets

(51) Int. Cl.
*G06F 3/023* (2006.01)
*G06F 3/02* (2006.01)

(56) References Cited

FOREIGN PATENT DOCUMENTS

| | | |
|---|---|---|
| JP | 2009-109758 A | 5/2009 |
| WO | 2011/030817 A | 3/2011 |

OTHER PUBLICATIONS

Bo-June (Paul) Hsu and Giuseppe Ottaviano, "Space-Efficient Data Structures for Top-k Completion", WWW '13 Proceedings of the 22nd international conference on World Wide Web, p. 583-594, May 2013.
English translation of Written opinion for PCT Application No. PCT/JP2014/005765.

* cited by examiner

Fig. 3

|    | DESCRIPTION | KANA-READING | FIRST |
|----|-------------|--------------|-------|
| 1  | Af          | アフ          | ×     |
| 2  | C           | シー          | ×     |
| 3  | E           | イー          | ×     |
| 4  | N           | エヌ          | ×     |
| 5  | ghan        | ガン          | ×     |
| 6  | の          | ノ            | ×     |
| 7  | が          | ガ            | ×     |
| 8  | 球          | キュウ        | ×     |
| 9  | 菌          | キン          | ×     |
| 10 | 研          | ケン          | ×     |
| 11 | 研究        | ケンキュウ    | 〇     |
| 12 | 性          | セイ          | ×     |
| 13 | 中          | チュウ        | ×     |
| 14 | 中毒        | チュウドク    | 〇     |
| 15 | アトピー    | アトピー      | 〇     |
| 16 | に          | ニ            | ×     |
| 17 | 効く        | キク          | ×     |
| 18 | 豆乳        | トウニュウ    | 〇     |
| 19 | 香水        | コウスイ      | 〇     |
| 20 | 用          | ヨウ          | ×     |
| 21 | アトマイザー | アトマイザー  | 〇     |
| ⋮  | ......      | ......       | ...... |

Fig. 4A

| POINTER | CONTENT |
|---------|---------|
| 1 | NEC中研 |
| 2 | 球菌性中毒 |
| 3 | Afghan |
| 4 | アトピーに効く豆乳 |
| 5 | 香水用アトマイザー |

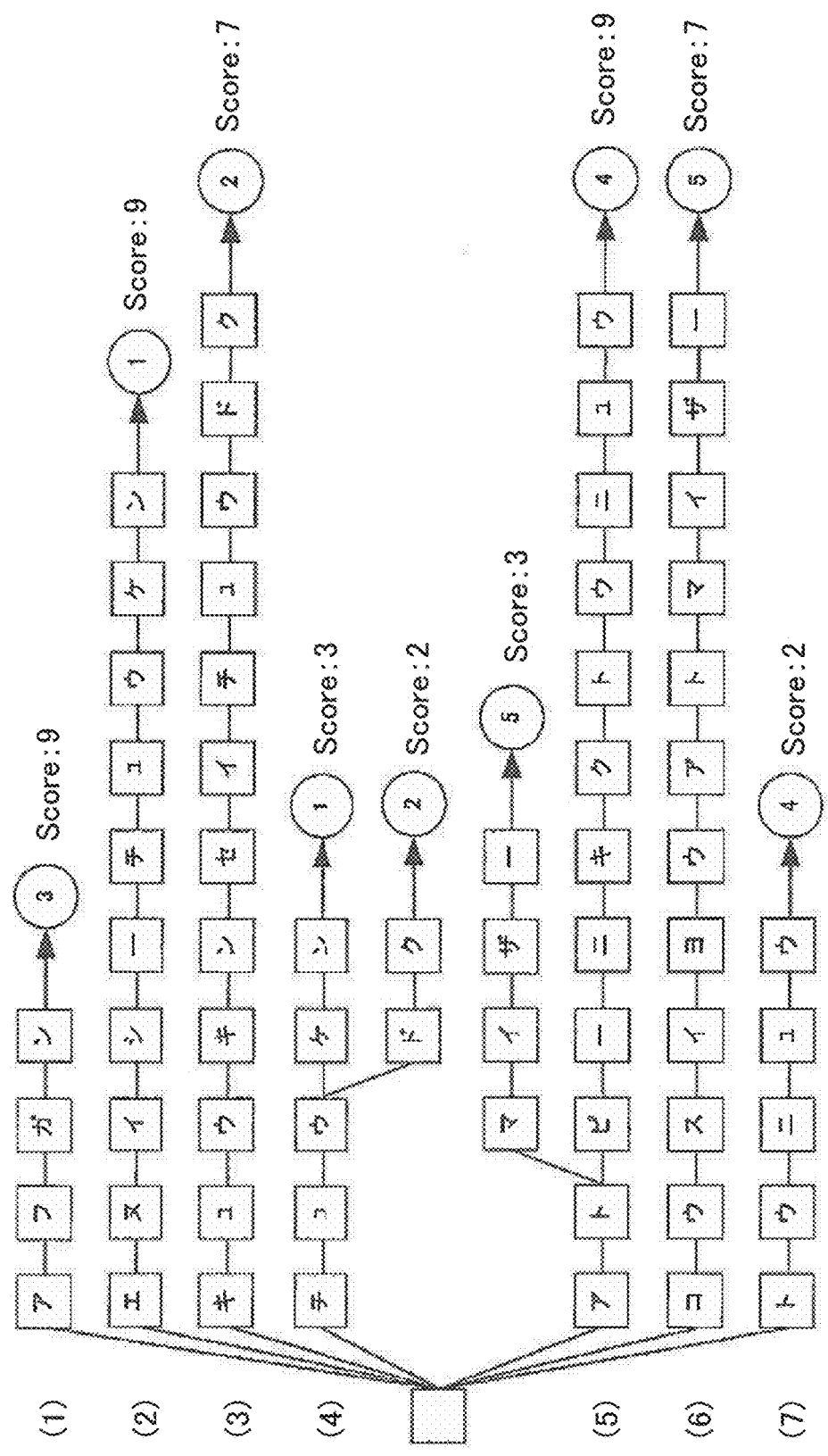

Fig. 8

| | DESCRIPTION | KANA-READING | LONG CONTENT WORD | PART OF SPEECH | KIND OF CHARACTER |
|---|---|---|---|---|---|
| 1 | Af | アフ | × | — | ALPHABET |
| 2 | C | シー | × | — | ALPHABET |
| 3 | E | イー | × | — | ALPHABET |
| 4 | N | エヌ | × | — | ALPHABET |
| 5 | ghan | ガン | × | — | ALPHABET |
| 6 | の | ノ | × | POSTPOSITIONAL PARTICLE | HIRAGANA |
| 7 | が | ガ | × | POSTPOSITIONAL PARTICLE | HIRAGANA |
| 8 | 球 | キュウ | × | NOUN | KANJI |
| 9 | 菌 | キン | × | NOUN | KANJI |
| 10 | 研 | ケン | × | NOUN | KANJI |
| 11 | 研究 | ケンキュウ | ○ | NOUN | KANJI |
| 12 | 性 | セイ | × | NOUN | KANJI |
| 13 | 中 | チュウ | × | NOUN | KANJI |
| 14 | 中毒 | チュウドク | ○ | NOUN | KANJI |
| 15 | アトピー | アトピー | ○ | NOUN | KATAKANA |
| 16 | に | ニ | × | POSTPOSITIONAL PARTICLE | HIRAGANA |
| 17 | 効く | キク | ○ | POSTPOSITIONAL PARTICLE | KANJI |
| 18 | 豆乳 | トウニュウ | ○ | NOUN | KANJI |
| 19 | 香水 | コウスイ | ○ | NOUN | KANJI |
| 20 | 用 | ヨウ | × | NOUN | KANJI |
| 21 | アドマイザー | アドマイザー | ○ | NOUN | KATAKANA |
| · | ····· | ····· | ····· | ····· | ····· |

INPUT ASSISTANCE DEVICE, INPUT ASSISTANCE METHOD AND STORAGE MEDIUM

This application is a National Stage Entry of PCT/JP2014/005765 filed on Nov. 18, 2014, which claims priority from Japanese Patent Application 2013-243128 filed on Nov. 25, 2013, the contents of all of which are incorporated herein by reference, in their entirety.

TECHNICAL FIELD

The present invention relates to an input assistance device, an input assistance method and a storage medium which, by suggesting an appropriate character string at a time when a user inputs a character, assists the user to input the character.

BACKGROUND ART

Recently, in various kinds of information equipment, a function which, when a user starts inputting a character string into a input form, selects a character string, that matches with the inputted character string, out of character strings recorded in advance, and suggests the selected character string as an input candidate is prevailing. The function is generally called 'auto complete function' (hereinafter, abbreviated as 'auto complete').

As a typical example to which the auto complete is applied, a search engine is exemplified. In the case of the search engine, as a specific example, when a user starts inputting a character string into a search form, the search engine extracts a character string, which matches with a character that the user is inputting, out of search key words which has been stored previously, and suggests the extracted character string to the user Hereinafter, the character string suggested to the user is described as 'suggested candidate character string'.

Therefore, in the case that the search engine uses the auto complete, it is unnecessary for the user to input a whole of the search key word, and it is possible to input a key word, which the user wants to input, only by selecting any one out of the suggested candidate character strings.

Such the auto complete is applicable to not only the search engine but also every application program which requires inputting into an input form. As an example of the application other than the search engine, the Web browser which requires to input URL (Uniform Resource Locator), the electronic mail software which requires to input a mail address, the electronic commerce cite which requires to input a product name, or the like.

Moreover, NPL (non-patent literature) 1 discloses an example of an art that realizes the auto complete. According to the art which is disclosed by NPL 1, a suggested candidate character string, whose head portion is identical with a character string inputted by a user, is searched at a high speed.

A subject of the art which is disclosed by NPL 1 is language, whose character string inputted by the user with a key board is identical with description of the suggested candidate character string, such as English. Moreover, according to the art, the identity judgement on the head portion is carried out merely by checking whether or not the character cord of the character string inputted by the user is identical with the character cord of the suggested candidate character string. Therefore, it is difficult to apply the art, which is disclosed by NPL 1, to language, whose character string inputted by the user is not identical with description of the suggested candidate character string, such as Japanese language.

Specifically, in the case of inputting in the Japanese language, most of users input a character string, which the user wants to input, in a kana character by use of the romaji/kana input method or the like, and afterward converts the kana into the kanji (Chinese character).

(Note 1) Japanese language is mainly described by a combination of the kana character and the kanji (Chinese character). The kana is a Japanese syllabary based on the Chinese character and includes the hiragana and the katakana. Furthermore, the romaji is alphabetical description of the kana. For example, out of a character string '入力された文字列' (inputted character string), '入力' and '文字列' are the kanji, and 'さ', 'れ' and 'た' are the hiragana. The katakana of 'さ', 'れ' and 'た' are 'サ', 'レ' and 'タ' respectively. Accordingly, since it is conceivable that the inputting is almost finished at a time when the kana is converted into the kanji, it is too late to suggest the suggested candidate character string to the user after conversion into the kanji, and it is necessary to suggest the suggested candidate character string to the user at a time when inputting the kana.

Therefore, in order to apply the auto complete to the inputting in the Japanese language, it is necessary to beforehand estimate a kana-reading of a character string candidate which is collected from a Japanese language document and to compare a kana character string which is inputted by the user, and the kana-reading of the suggested candidate character string.

(Note 2) The kana-reading indicates how to read the kanji. For example, a kana-reading of '文字列' is 'モジレツ' in the katakana or 'もじれつ' in the hiragana.

As a method for estimating the kana-reading of the suggested candidate character string, a method of using a Japanese language dictionary, which describes relation between the suggested candidate character string and its kana-reading, is exemplified. According to the method, when a suggested candidate character string is collected from a Japanese language document, the suggested candidate character string is divided into portions each of which is identical with the description which exists in the dictionary. Next, kana-readings each of which is related to each portion are concatenated, and consequently the kana-reading of the suggested candidate character string is estimated.

The above-mentioned method for estimating the kana-reading by use of the dictionary can be realized by the method called the morphemic analysis. Furthermore, by use of each kana-reading of each portion of the suggested candidate character string, an index of the original suggested candidate character string is generated, and at a time when a user inputs a kana by use of the index, it is possible to suggest a suggested candidate character string which is related to the inputted kana.

Here, an art for suggesting the suggested candidate character string to the user in reply to the user's inputting the kana will be explained. PTL 1 discloses an art of searching information by use of the voice recognition.

According to the art which is disclosed by PTL 1, for example, a character string of 'スーパーフニット国分寺ストア' is divided into four words of 'スーパー', 'フニット', '国分寺' and 'ストア' with reference to the dictionary. Here, 'スーパー', 'フニット' and '国分寺" are an abbreviation of スーパーマーケット (supermarket), an example of a trade name and an example of a place name respectively. Then, by using kana-readings of four words which are described in the dictionary, a kana reading of 'スーパー フニット コクブンジ スト ア' is estimated.

(Note 3) 'コクブンジ' is a kana-reading in the katakana of the '国分寺' which is the kanji.

When the user inputs 'フニツ' with the voice input method, a partial character string of 'フニット' whose head portion is identical with 'フニツ' is searched, and the original character string of 'スーパー フニ ット 国分寺 ストア' including the partial character string is estimated and then the original character string is suggested to the user.

CITATION LIST

Patent Literature

[PTL 1] WO 2011/030817

Non Patent Literature

[NPL 1] Bo-June (Paul) Hsu and Giuseppe Ottaviano, "Space-Efficient Data Structures for Top-k Completion", WWW '13 Proceedings of the 22nd international conference on World Wide Web, p 583-594, May, 2013

SUMMARY OF INVENTION

Technical Problem

As mentioned above, if using the art which is disclosed by PTL 1, it is possible for the user to be presented with the suggested candidate character string including the kanji only by inputting the kana. However, the art has a problem that accuracy in suggestion is low.

Specifically, in the case that a character string is divided into a plurality of words by merely referring to the dictionary, the acquired words include many words which have low probability of being used first by the user at a time of inputting. Therefore, as a suggestion result which is presented to the user, a character string, which is different from the character string that the user wants to input, is suggested to the user as the suggested candidate character string, and consequently the problem that the accuracy in suggestion is lowered is caused.

For example, in the case that a commodity name of 'アトピーに効く豆乳' is recorded, a case that the commodity name is suggested on the basis of an inputted key word by using the art which is disclosed by PTL 1 will be studied in the following. In the case that the user inputs 'アトピ' or 'トウニュ', 'アトピーに効く豆乳' is usually outputted as the suggested candidate character string.

(Note 4) 'アトピーに効く豆乳' means 'soymilk effective for atopy where '豆乳', '効く', 'に' and 'アトピー' mean 'soymilk', 'effective', 'for' and 'atopy' respectively. Kana-readings of '豆乳', '効く', 'に' and 'アトピー' are 'トウニュウ', 'キク', 'ニ' and 'アトピー' in the kana respectively.)

However, in the case of using the art which is disclosed by PTL 1, even when the user inputs 'キク' or 'キクト', there is a probability that 'アトピーに効く豆乳' is outputted as the suggested candidate character string. That is, in the case of inputting 'キク' or 'キクト', it is usually conceived that the user expects words (for example, '菊と刀 (キクトカタナ: Chrysanthemum and Sword)) other than 'アトピーに効く豆乳'. As a result, the user has a suspicious feeling for the suggestion.

Moreover, the reason why the problem that the accuracy in suggestion is low is caused is that the probability of being used first by the user at the time of inputting is different per the word which exists in the character string. For example, '効く' is a word in front of which '…に' is used. Accordingly, there is a low probability that the user uses 'キク' first at the time of inputting with intention of converting 'キク' into '効く', that is, and '効く' is a word which has the low probability of being used first by the user at the time of inputting. Meanwhile, '豆乳' is apt to be used by itself, and there is a high probability that the user uses 'トウニュウ' first at the time of inputting with intention of converting 'トウニュウ' into '豆乳', that is, 'トウニュウ' is a word which has the high probability of being used first by the user at the time of inputting.

As mentioned above, among the words which are included by the same suggested candidate character string, there are the word which has the high probability of being used first by the user at the time of inputting, and the word which has the low probability of being used by the user at the time of inputting. Therefore, the art, which is disclosed by PTL 1, causes the problem that the accuracy in suggestion is lowered.

An example of an object of the present invention is to solve the above-mentioned problem, and specifically to provide an input assistance device, an input assistance method and a storage medium which can present a character string to be suggested to a user in consideration of a probability of being inputted first in a character string.

Solution to Problem

To achieve the above object, an input assistance device according to one aspect of the present invention, the device for assisting a user to input a character string, includes:

a character string determining means that determines a character string to be suggested relating to the inputted kana character string, in the case that a user inputs a kana character string by use of index structure, the index structure recording therein a word together with its kana-reading and the index structure indicating whether or not it is probable that the word is inputted first at a time of inputting a character string; and a suggested candidate presenting means that presents the character string to be suggested, which is determined, as a suggested candidate.

To achieve the above object, an input assistance method according to one aspect of the present invention is provided for assisting a user to input a character string. The method includes:

determining a character string to be suggested relating to the inputted kana character string, in the case that a user inputs a kana character string by use of index structure, the index structure recording therein a word together with its kana-reading and the index structure indicating whether or not it is probable that the word is inputted first at a time of inputting a character string; and presenting the character string to be suggested, which is determined, as a suggested candidate.

To achieve the above object, a program stored in storage medium according to one aspect of the present invention is provided assisting a user to input a character string by a computer. The program causes the computer implement for:

determining a character string to be suggested relating to the inputted kana character string, in the case that a user inputs a kana character string by use of index structure, the index structure recording therein a word together with its kana-reading and the index structure indicating whether or not it is probable that the word is inputted first at a time of inputting a character string; and presenting the character string to be suggested, which is determined, as a suggested candidate.

Advantageous Effects of Invention

As mentioned above, according to the present invention, it is possible to present the character string to be suggested to the user in consideration of the probability of being inputted first in the character string.

BRIEF DESCRIPTION OF DRAWINGS

FIG. 3 is a diagram showing an example of information which is recorded in index structure used in the first exemplary embodiment of the present invention.

FIG. 4A is a diagram showing an example of a concept on a pointer and its content which are used in the index structure used in the first exemplary embodiment of the present invention.

FIG. 5 is a conceptual diagram showing an example of the try tree using the index structure which is used in the first exemplary embodiment of the present invention.

FIG. 8 is a diagram showing an example of a dictionary which is used for constructing index structure in the second exemplary embodiment of the present invention.

DESCRIPTION OF EMBODIMENTS

Figure 1:
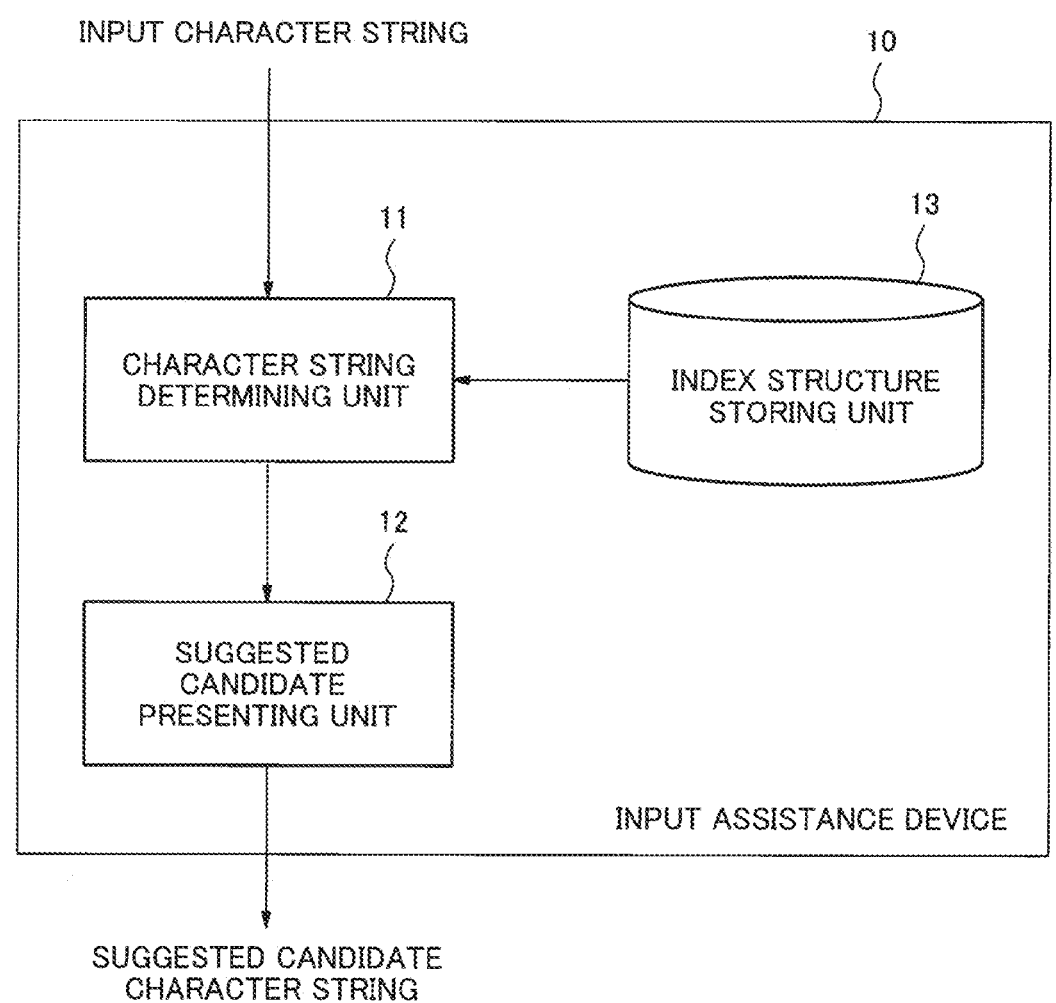
FIG. 1 is a block diagram showing a schematic configuration of an input assistance device in a first exemplary embodiment of the present invention.

Hereinafter, an exemplary embodiment of the present invention will be explained in detail with reference to drawings. In the exemplary embodiment which will be explained in the following, input assistance is carried out by use of index structure. But, the index structure in the exemplary embodiment is different from index structure that a kana-reading of each word, which is included by a character string to be suggested to a user, is merely recorded. In the exemplary embodiment of the present invention, the index structure, in which a word is recorded together with its kana-reading and which indicates whether or not it is probable that, at a time of inputting a character string, each word of the character string is inputted first, is used.

Therefore, in the case that the user inputs a kana character which is identical with a kana-reading of a word having aptness to be inputted first at the time of inputting, a character string including the word is suggested. On the other hand, in the case that the user inputs a kana character which is not identical with the kana-reading of the word, suggestion of a character string is not carried out.

For example, it is assumed that 'アトピーに効く豆乳' is recorded as the character string to be suggested, and furthermore 'アトピー(アトピー in the katakana)' and '豆乳(トウニュウ in the katakana)' have the probability to be inputted first at the time of inputting. In this case, when the user inputs 'アトピ' or 'トウニュ', 'アトピーに効く豆乳' is suggested. But, when the user inputs 'キク' or 'キクト', 'アトピーに効く豆乳' is not suggested. As a result, the accuracy in suggestion which is carried out in the input assistance is improved.

Here, as the character string to be suggested, a character string, which is recorded in advance, is used. Furthermore, a character string, which is a subject for record, can be acquired from, for example, an input log, a product catalog, an address book, or the like which has been stored by a search system. Moreover, there may be two kinds of 'word' which is recorded in the index structure, that is, a word which has an understandable mean by itself, and a word (incomplete word) which is generated by dividing a word which has the understandable mean by itself. As an example of the incomplete word, 'Af (kana-reading is アフ)' and 'ghan (kana-reading is ガン)' which are acquired by dividing 'Afghan (kana-reading is アフガン)' and the like are exemplified.

Moreover, in the exemplary embodiment of the present invention, it is a preferable aspect that, when suggesting a character string, a portion, which is included by the character string of a suggested candidate and which is related to a kana character string inputted by the user, is highlighted and displayed. By virtue of the aspect, the user can understand which portion of the character string of the suggested candidate the kana character string inputted by the user is related to. Furthermore, the user can quickly judge whether or not the character string of the suggested candidate is appropriate.

Furthermore, in the exemplary embodiment of the present invention, the index structure can be constructed by referring to a dictionary which describes a relation between description of a word and its kana-reading. Specifically, it is assumed that a list of the character strings to be suggested is given in advance. Next, a kana-reading which is related to each character string is estimated. Moreover, estimation of the kana-reading, which is related to each of the character strings, is carried out by use of the dictionary. At this time, if a short character string, which does not form a word by itself, is recorded by the dictionary, it is possible to improve accuracy in estimating the kana-reading.

Next, each character string which is written in the list is divided into partial character strings having a short length, and a partial character string, which has the probability to be inputted first, is estimated out of the acquired partial character strings. Then, the index structure having data structure, in which a kana-reading related to the partial character string having the probability to be inputted first is defined as a key, is constructed.

Moreover, the partial character string is recorded in the index structure as 'word'. Accordingly, the partial character string, which is acquired by the division, may be the word which is understandable by itself, or may be the word (incomplete word) generated by furthermore dividing the word which is understandable by itself. Here, the index structure, in which also the incomplete word is recorded, indicates whether or not it is probable that the word is inputted first. By the above, a situation in which the incomplete word is suggested by mistake is avoided.

Moreover, it is possible to judge whether or not it is probable that the partial character string is inputted first, for example, on the basis of statistical data (appearance frequency or the like) on each character string existing in a set of documents from which the character string to be suggested is acquired, or on the basis of a predetermined rule.

(First Exemplary Embodiment)

Hereinafter, an input assistance device, an input assistance method and a storage device in a first exemplary embodiment of the present invention will be explained with reference to FIG. 1 to FIG. 6.

[Configuration of Device]

Firstly, a configuration of the input assistance device in the first exemplary embodiment of the present invention will be explained with reference to FIG. 1. FIG. 1 is a block diagram showing a schematic configuration of the input assistance device in the first exemplary embodiment of the present invention.

An input assistance device 10 in the first exemplary embodiment which is shown in FIG. 1 is a device for assisting a user to input a character string. As shown in FIG. 1, the input assistance device 10 includes a character string determining unit 11 and a suggested candidate presenting unit 12.

In the case that the user inputs a kana character string, the character string determining unit 11 out of the above-mentioned units determines a character string to be suggested, which is related to the inputted kana character string, by use of index structure stored by an index structure storing unit 13. The index structure records a word and its kana-reading, and indicates whether or not it is probable that each word is inputted first at a time of inputting a character string. Moreover, the suggested candidate presenting unit 12 presents the character string to be suggested, which is determined by the character string determining unit 11, as a suggested candidate.

Moreover, in the first exemplary embodiment, a kana character string means a character string whose conversion into a kanji, a mark, a figure, an alphabet or the like is predetermined. Furthermore, the kana character string may be composed of any one of the hiragana, the katakana and the romaji. To input a kana character string may be carried out by directly inputting the kana character or may be carried out by inputting the romaji.

As mentioned above, in the first exemplary embodiment, the index structure indicates whether or not it is probable that each word is inputted first by the user. Accordingly, only in the case that a word, which is related to the kana character string inputted by the user, has the probability to be inputted first, the input assistance device 10 can suggest a character string including the word which is related to the kana character string. That is, according to the first exemplary embodiment, since it is possible to present the suggested candidate to the user in consideration of the probability of being inputted first in the character string, differently from the conventional art, it is possible to avoid a situation of suggesting the unnatural character string which is related to the inputted kana character string.

Figure 2:
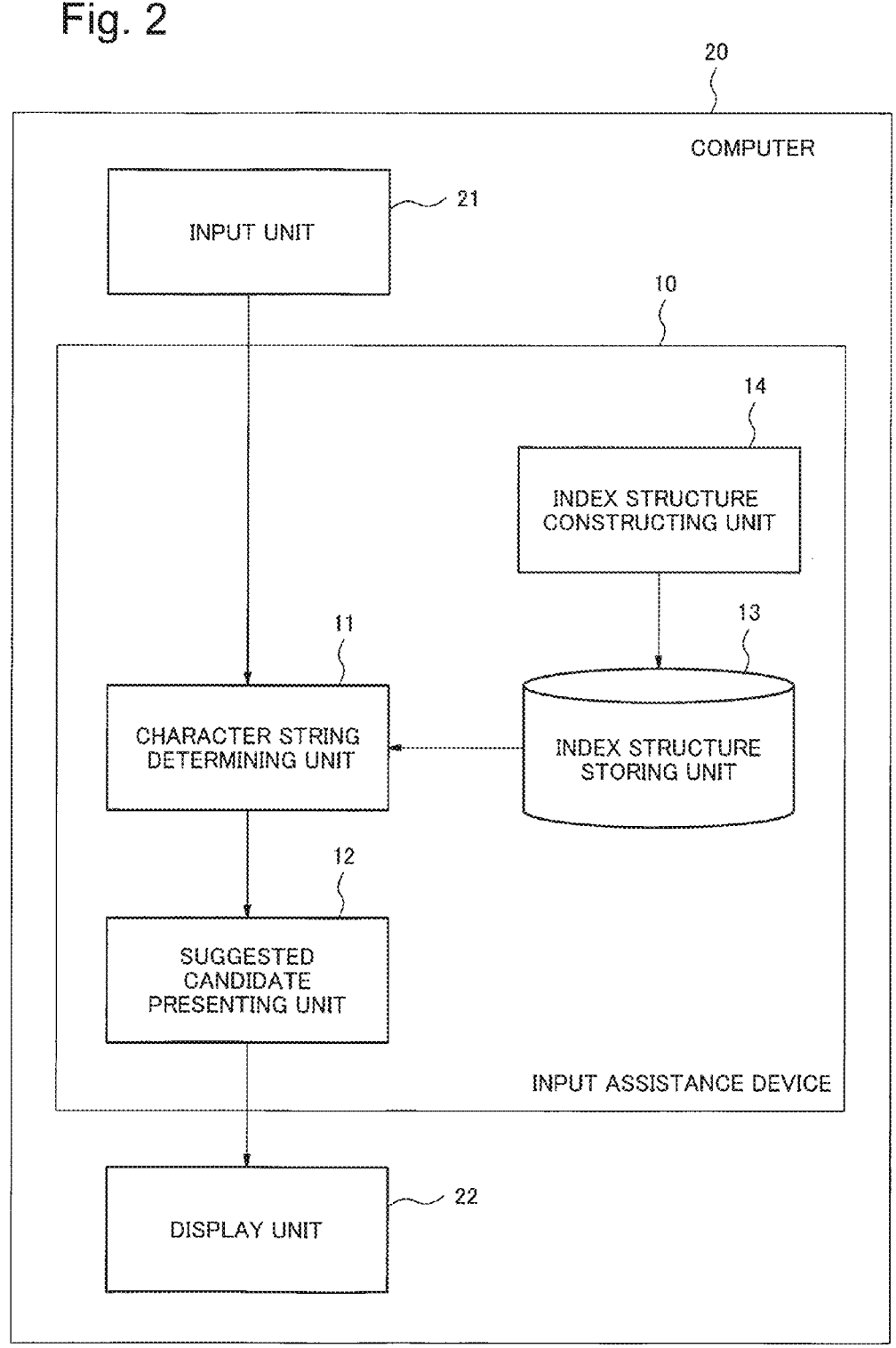
FIG. 2 is a block diagram showing a specific configuration of the input assistance device in the first exemplary embodiment of the present invention.

Here, with reference to FIG. 2, the configuration of the input assistance device 10 will be explained more specifically. FIG. 2 is a block diagram showing a specific configuration of the input assistance device in the first exemplary embodiment of the present invention.

As shown in FIG. 2, according to the present exemplary embodiment, the input assistance device 10 is realized by a program with using a computer 20, and assists an input work of the user in various kinds of application programs which are executed by the computer 20. Therefore, the inputting by the user into the input assistance device 10 is carried out through an input unit 21. The input unit 21 is input equipment, which the computer 20 includes, such as a key board and a touch panel. Moreover, in order to present the suggested candidate to the user, the input assistance device 10 outputs the character string, which is the suggested candidate, to a display unit 22. The display unit 22 is a display device which the computer 20 includes.

Moreover, as shown in FIG. 2, in the present exemplary embodiment, the input assistance device 10 includes the above-mentioned index structure storing unit 13. The index structure storing unit 13 is constructed in a storage area of a storage device (not shown in FIG. 2) such as a hard disk or the like which the computer 20 includes. Here, the index structure storing unit 13 may be constructed in a storage area of a storage device which a computer other than the computer 20 includes.

Moreover, according to the present exemplary embodiment, on the basis of the index structure which the index structure storing unit 13 stores, the character string determining unit 11 determines that a character string, which is related to the inputted kana character string and which includes the word having an indication of having the probability of being inputted first at the time of inputting, is the character string to be suggested.

Specifically, in the present exemplary embodiment, the character string to be suggested is determined in two cases mentioned in the following. The first case is that, in the index structure which is stored by the index structure storing unit 13, at least a head portion of a kana-reading of a word is identical with the inputted kana character string, and the word is recorded. In this case, on the condition that it is indicated that the word has the probability of being inputted first at the time of inputting, the character string determining unit 11 extracts a character string, which includes the word, from the index structure storing unit 13 and determines the character string as the suggested candidate.

The second case is that, in the index structure which is stored by the index structure storing unit 13, at least a head portion of a kana-reading of concatenated plural and consecutive words in a character string is identical with the inputted kana character string. In this case, on the condition that it is indicated that a head word out of the plural and consecutive words has the probability of being inputted first at the time of inputting, the character string determining unit 11 extracts a character string, which includes the plural and consecutive words, from the index structure storing unit 13 and determines the character string as the suggested candidate.

Figure 4B:
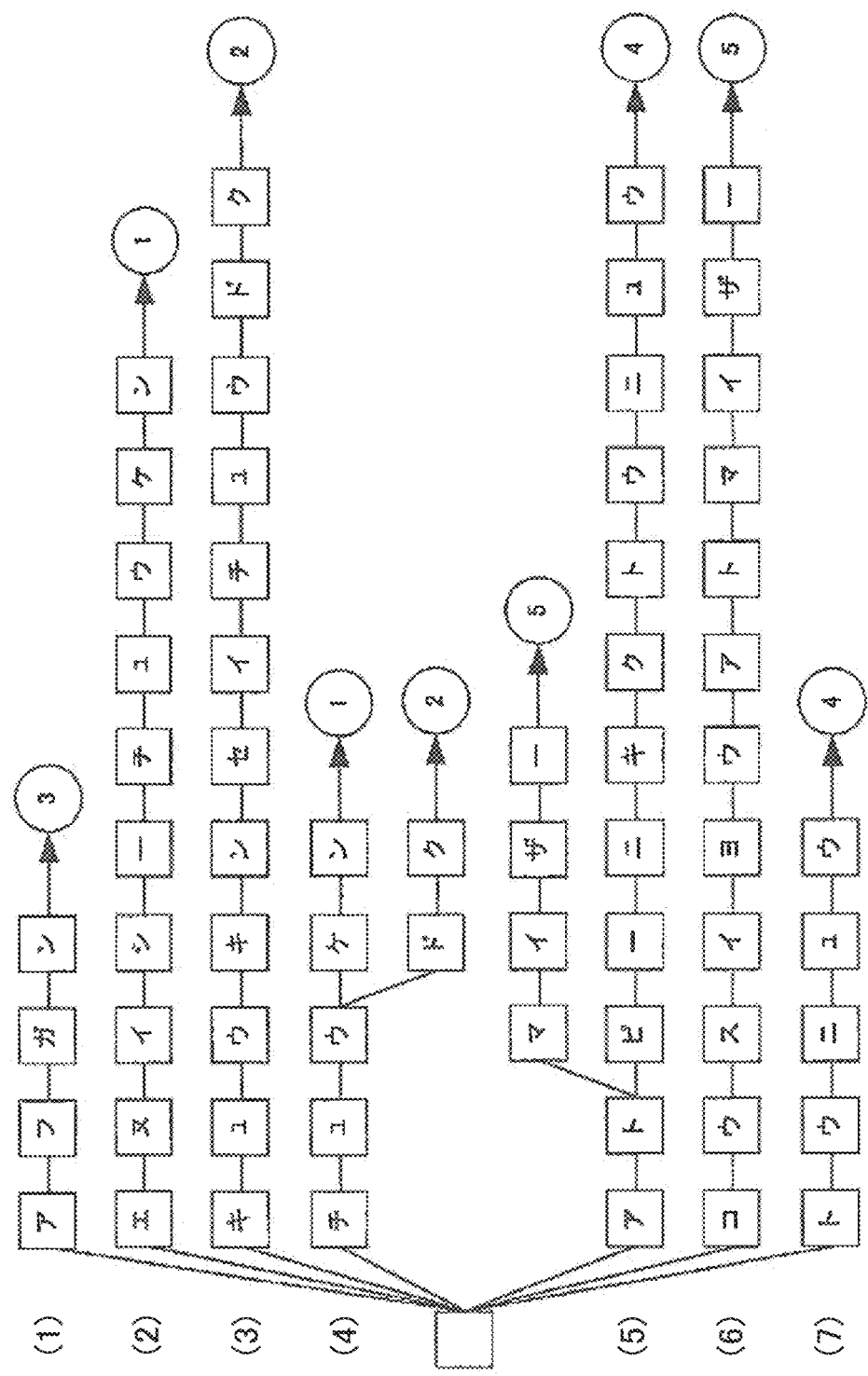
FIG. 4B is a conceptual diagram showing an example of the try tree using the index structure which is used in the first exemplary embodiment of the present invention.

Next, a specific example of the index structure which the index structure storing unit 13 stores will be explained in the following with reference to FIG. 3 to FIG. 5. FIG. 3 is a diagram showing an example of information which is recorded in the index structure used in the first exemplary embodiment of the present invention. Each of FIG. 4A and FIG. 4B is a diagram showing an example of the index structure used in the first exemplary embodiment of the present invention. FIG. 5 is a diagram showing another example of the index structure used in the first exemplary embodiment of the present invention.

As shown in FIG. 3, a plurality of words are recorded in the index structure which the index structure storing unit 13 stores, and furthermore a kana-reading of each word is recorded. As mentioned above, not only the word which has the understandable mean by itself but also the incomplete word are recorded. Moreover, an item of 'First' in FIG. 3 indicates whether or not it is probable that each word is inputted first at the time of inputting. In the case that the probability is high, a mark 'o' is written in the item, and in the case that the probability is low, a mark 'x' is written in the item.

Furthermore, in the first exemplary embodiment, the word which is recorded in the index structure is generated by dividing a candidate for the character string to be suggested (refer to second exemplary embodiment mentioned later). Specifically, 'Af' and 'ghan' are generated by dividing 'Afghan'. 'N', 'E', 'C', '中' and '研' are generated by dividing 'NEC中研'. '球', '菌', '性', '中' and '毒' are generated by dividing '球菌性中毒'. 'アトピー', 'に', '効く' and '豆乳' are generated by dividing 'アトピーに効く豆乳'. '香水', '用', and 'アトマイザー' are generated by dividing '香水用アトマイザー'.

(Note 5) 'NEC中研' is an abbreviation of ''NEC中央研究所', and means 'NEC central research laboratory' where 'NEC', '中央' and '研究所' mean a company's name, 'central' and 'research laboratory' respectively. Kana-readings of 'N', 'E', 'C', '中', '央', '研', '究' and '所' are 'エヌ', 'イー', 'シー'. 'ケン', 'キュウ', and 'ショ' respectively.

(Note 6) '球菌性中毒' means coccus poisoning where '球菌性' and '中毒' mean 'coccus' and 'poisoning'. Kana-readings of '球', '菌', '性', '中' and '毒' are 'キュウ', 'キン', 'セイ', 'チュウ' and 'ドク' respectively.

(Note 7) '香水用アトマイザー' means 'atmizer for perfume' where 'アトマイザー',' 用' and '香水' mean 'atmizer', 'for', and 'perfume' respectively. Kana-readings of '香水',' 用' and 'アトマイザー' are 'コウスイ', 'ヨウ' and 'アトマイザー' respectively.

Moreover, for example, a candidate of 'アトピーに効く豆乳' is divided into four words of 'アトピー', 'に', '効く' and '豆乳' as mentioned above. Since it is conceivable that 'に' and '効く' out of the four words have the low probability of being inputted first, the mark 'x' is written in the item 'First'. On the other hand, since it is conceivable that 'アトピー' and '豆乳' have the high probability of being inputted first, the mark 'o' is written in the item 'First'.

Similarly, a candidate of '香水用アトマイザー' is divided into three words of '香水',' 用' and 'アトマイザー'. Since it is conceivable that '用' out of the three words has the low probability of being inputted first, the mark 'x' is written in the item 'First'. On the other hand, since it is conceivable that '香水' and 'アトマイザー' have the high probability of being inputted first, the mark 'o' is written in the item 'First'.

An example of the index structure will be explained in the following. In the first exemplary embodiment, a case of carrying out the input assistance by use of the character string (index structure) to be suggested shown in FIG. 4. As shown in FIG. 4A, 'NEC中研',' 球菌性中毒', 'Afghan','アトピーに効く豆乳', and '香水用アトマイザー' are recorded as a first pointer, a second pointer, a third pointer, a fourth pointer and a fifth pointer respectively.

Moreover, as shown in FIG. 4B, the index structure is realized, for example, by the try tree in the first exemplary embodiment. The try tree, which is a kind of the tree structure, is structured so that a path composing the tree structure may express a character string. Furthermore, in the try tree, a word having the probability of being inputted first (word for which the mark 'o' is written in the item 'First' shown in FIG. 3) is used as an upper layer path, and the lowest layer path is assigned a pointer which points a related candidate (character string to be suggested). Here, the upper layer means a left side portion of FIG. 4B (FIG. 5) and the lower layer means a right side portion of FIG. 4B (FIG. 5).

Accordingly, in the case that the index structure shown in FIG. 4B is used, the character string determining unit 11 traces the try tree on the basis of the kana character inputted by the user, and, if an end node at which the character string determining unit 11 arrives is assigned the pointer (corresponding to an item 'Pointer' in FIG. 4A), the character string determining unit 11 acquires a candidate (character string to be suggested) on the basis of the pointer. The acquired candidate is presented as the suggested candidate.

For example, it is assumed that the user inputs 'アト' as the kana character string. In this case, the character string determining unit 11 firstly passes a path which is related to the kana character string of 'アトマイザー', and then acquires '香水用アトマイザー', which is recorded as the fifth pointer, as the candidate. Next, the character string determining unit 11 passes also a path which is related to the kana character string of 'アトピーニキクトウニュウ', and then acquires 'アトピーに効く豆乳', which is recorded as the fourth pointer, as the candidate. Accordingly, the character string determining unit 11 acquires two candidates in this case.

Moreover, according to the first exemplary embodiment, as shown in FIG. 5, a score may be set to each candidate for the character string to be suggested on the basis of statistical data (for example, appearance frequency of each candidate in a source from which each candidate is acquired) in the index structure storing unit 13. In this case, when there are a plurality of the character strings to be suggested, the suggested candidate presenting unit 12 can set an order of priority to each character string on the basis of the score, and can present each character string as the suggested candidate in the order of priority.

Specifically, for example, it is assumed that the user inputs 'アト' as the kana character string. In this case, since the character string determining unit 11 acquires '香水用アトマイザー' and 'アトピーに効く豆乳', the suggested candidate presenting unit 12 presents both as the suggested candidate. According to the example shown in FIG. 5, the latter candidate has the high score. Accordingly, the suggested candidate presenting unit 12 presents 'アトピーに効く豆乳' and '香水用アトマイザー' in this order.

A method for determining the score is not limited. For example, the score may be set so that a candidate, whose head portion is identical with the kana character string inputted by the user, may have a higher score than a candidate, whose middle portion is identical with the kana character string inputted by the user, has.

As mentioned above, in the case that, in the index structure, the score is set to each candidate for the character string to be suggested, a candidate which is more appropriate as the suggested candidate is listed at an upper position. As a result, accuracy in suggestion is improved more.

Moreover, according to the first exemplary embodiment, the suggested candidate presenting unit 12 can present a portion, which is included by the character string to be suggested (that is, suggested candidate) that is determined by the determining unit 11, and which is related to the inputted kana character string, in a form different from a form of another portion.

Specifically, in the case of using the form, the character string determination unit 11 provides the suggested candidate presenting unit 12 with not only the character string to be suggested but also information indicating where the portion, which is related to the inputted kana character string, exists in the character string to be suggested. Then, the suggested candidate presenting unit 12 identifies the portion, which is related to the inputted kana character string, on the basis of the provided information, and carries out a highlight display, addition of an under line, a change of font, a change of color or the like to the identified portion.

Moreover, it is possible to identify the portion, for example, by segments or marks which are assigned an starting point and an end point of the portion related to the inputted kana character string.

Furthermore, if at least a head portion of a kana-reading of a word is identical with the kana character string inputted by the user, the word is exemplified as 'portion related to the kana character string inputted by the user'. Moreover, in the case that at least a head portion of a kana-reading of concatenated plural and consecutive words in a character string is identical with the kana character string inputted by the user, the concatenated plural and consecutive words in the character string are exemplified as 'portion related to the kana character string inputted by the user', For example, it is assumed that, in the case that the index structure shown in FIG. 3 is used, the user inputs 'アトピ' as the kana character string. In this case, the character string determining unit 11 suggests 'アトピーに効く豆乳' and simultaneously the suggested candidate presenting unit 12 carries out the highlight display to 'アトピー', or the like. Moreover, it is assumed that the user inputs 'アトピーニキ' as the kana character string. Also in this case, the character string determining unit 11 suggests 'アトピーに効く豆乳' but, in this case, the suggested candidate presenting unit 12 carries out the highlight display or the like to 'アトピー', 'に' and '効く'.

According to the above-mentioned aspect, the user can quickly understand which portion in the character string, that is the suggested candidate, the kana character string inputted by the user is related to, and can quickly judge whether or not the character string which is the suggested candidate is appropriate. The aspect is useful at a time when the user distinguishes a character string, which the user wants to input, among a plurality of suggested candidates.

[Operation of Device]

Figure 6:
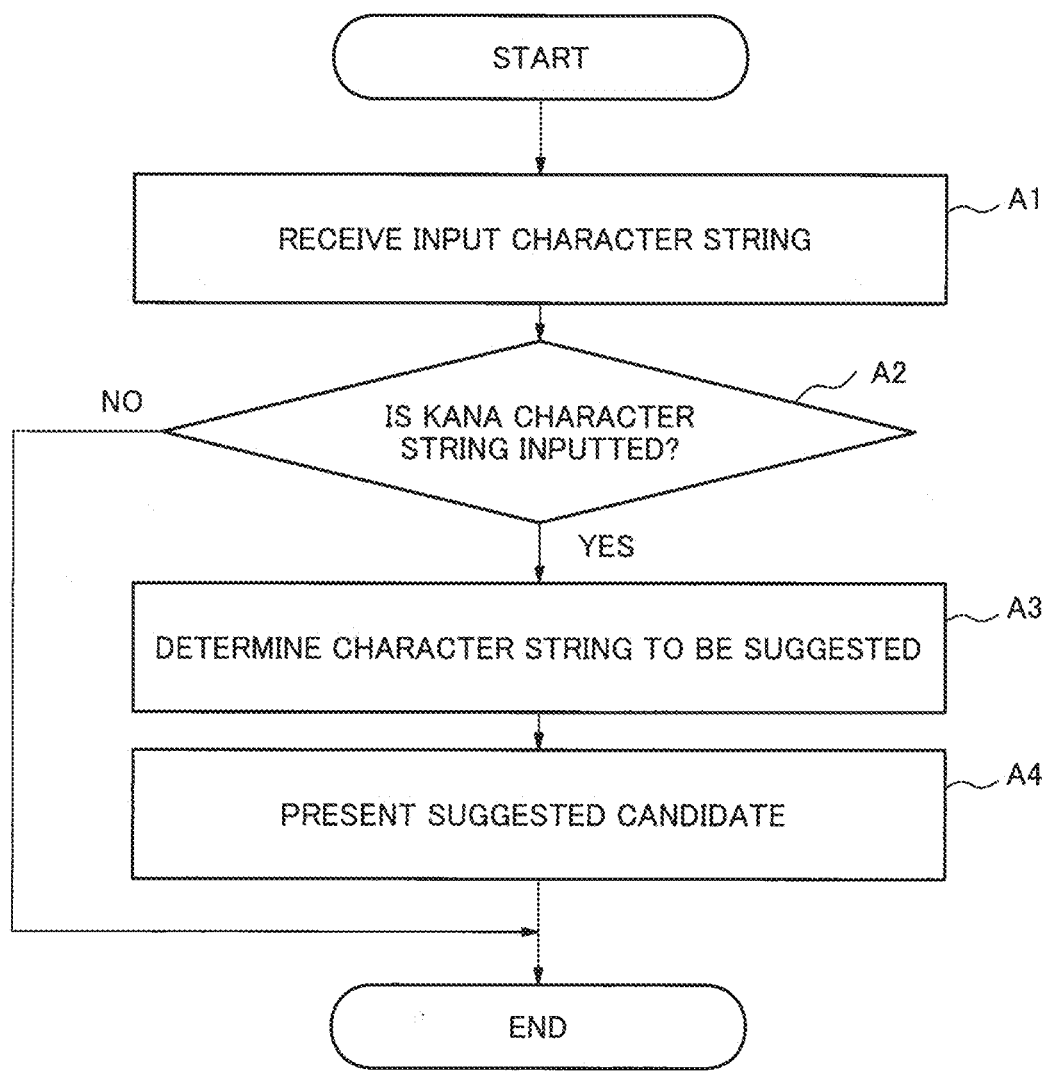
FIG. 6 is a flow diagram showing an operation of the input assistance device in the first exemplary embodiment of the present invention.

Next, an operation of the input assistance device 10 in the first exemplary embodiment of the present invention will be explained with reference to FIG. 6. FIG. 6 is a flow diagram showing the operation of the input assistance device in the first exemplary embodiment of the present invention. In the following explanation, FIG. 2 to FIG. 5 are appropriately taken into consideration. Moreover, in the first exemplary embodiment, by making the input assistance device 10 operate, an input assistance method is carried out. Accordingly, to explain the operation of the input assistance device 10, which will be shown in the following, is identical with to explain an input assistance method in the first exemplary embodiment.

As shown in FIG. 6, firstly, the character string determining unit 11 of the input assistance device 10 receives a character string which the user inputs through the input unit 21 (Step A1). Next, the character string determining unit 11 judges whether or not the inputted character string is the kana character string (Step A2).

In the case that the judgment result in Step A2 is that the inputted characteristic string is not the kana character string, a process in the input assistance device 10 is ended. On the other hand, in the case that the judgment result in Step A2 is that the inputted characteristic string is the kana character string, the character string determining unit 11 acquires a character string, which is related to the inputted kana character string and which includes a word having the probability of being inputted first at the time of inputting, from the index structure storing unit 13 as the character string to be suggested.

Specifically, in Step A3, the character string determining unit 11 determines the character string to be suggested by comparing the inputted kana character string with the index structure shown in FIG. 3. Here, in the case that a head portion of the inputted kana character string is not identical with any one of the kana characters which are recorded in the index structure storing unit 13, the process in the input assistance device 10 is ended.

Next, the suggested candidate presenting unit 12 presents the character string, which is determined in Step A3, as the suggested candidate (Step A4). Specifically, the suggested candidate presenting unit 12 provides the display unit 22 with the character string which is the suggested candidate. By carrying out the above, the user can confirm the suggested candidate which is related to the inputted kana character string, and afterward can determine the character string which the user searches for.

[Program]

Moreover, it is sufficient that a program in the first exemplary embodiment is a program which makes a computer carry out Steps A1 to A4 shown in FIG. 6. By installing the program in the computer and executing the program, it is possible to realize the input assistance device 10 and the input assistance method in the first exemplary embodiment. In this case, CPU (Central Processing Unit) of the computer works as the character string determining unit 11 and the suggested candidate presenting unit 12 to carry out the processes of these units.

[Effect of First Exemplary Embodiment]

As mentioned above, according to the first exemplary embodiment, only in the case that the word, which is related to the kana character string inputted by the user, has the probability of being inputted first, the input assistance device can suggest the character string which includes the word related to the kana character string. As a result, it is possible to realize the input assistance with high accuracy in suggestion.

(Second Exemplary Embodiment)

Next, an input assistance device, an input assistance method and a storage device in a second exemplary embodiment of the present invention will be explained with reference to FIG. 7 to FIG. 9.

[Configuration of Device]

Firstly, a configuration of the input assistance device in the second exemplary embodiment of the present invention will be explained with reference to FIG. 7. FIG. 7 is a block diagram showing a schematic configuration of the input assistance device in the second exemplary embodiment of the present invention.

Figure 7:
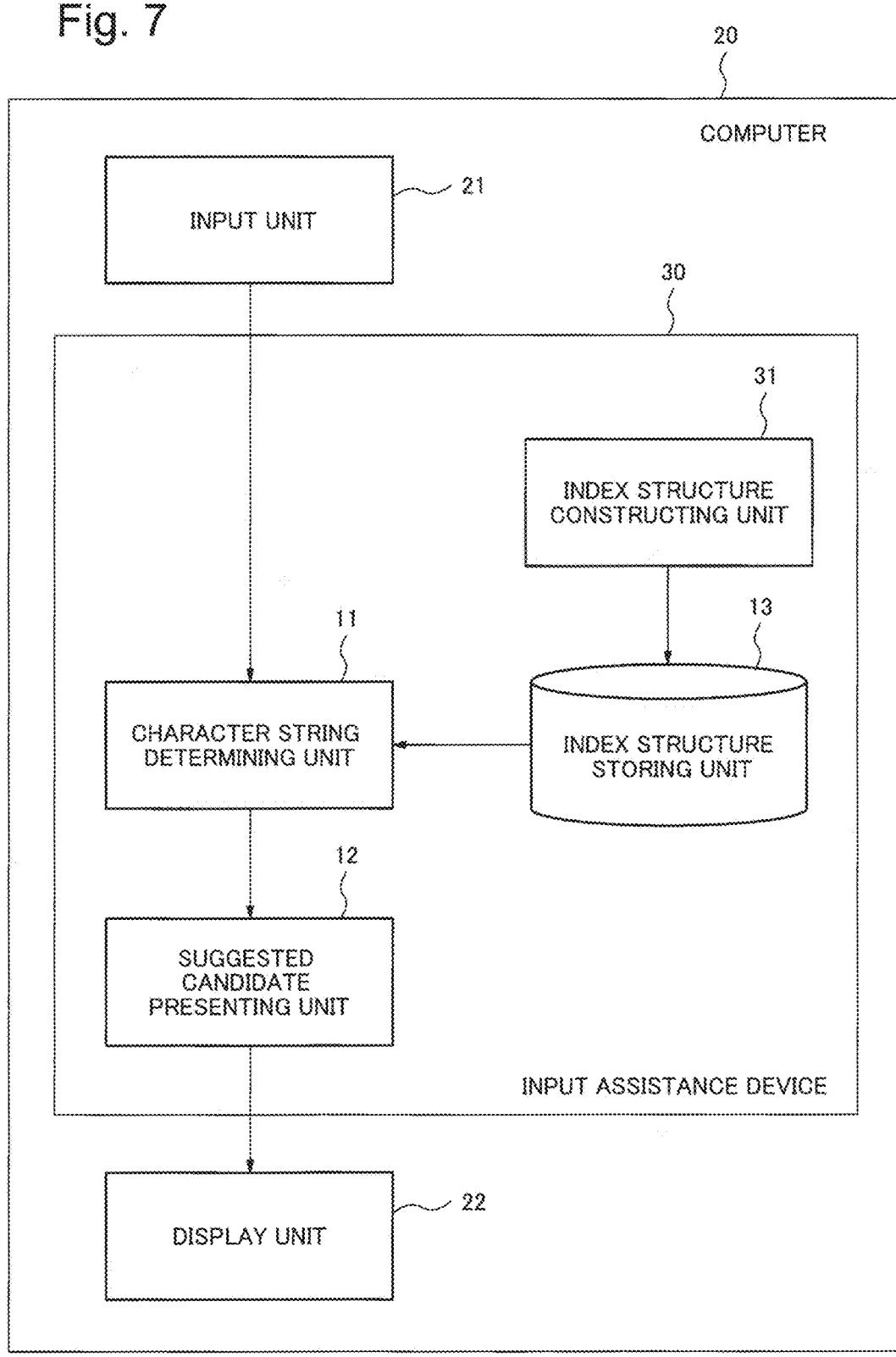
FIG. 7 is a block diagram showing a schematic configuration of an input assistance device in a second exemplary embodiment of the present invention.

As shown in FIG. 7, an input assistance device 30 in the second exemplary embodiment includes an index structure constructing unit 31 differently from the input assistance device 10 in the first exemplary embodiment.

Except for the above-mentioned point, the input assistance device 30 is configured similarly to the input assistance device 10 in the first exemplary embodiment. Accordingly, with mainly focusing on the different point, explanation will be given in the following.

Firstly, by use of a dictionary in which description of a word and its kana-reading is associated each other, the index structure constructing unit 31 divides a candidate for a character string to be suggested into a plurality of partial character strings. 'Partial character string' which is acquired by the division may be composed of only one word, and number of words has no limitation.

Next, the index structure constructing unit 31 judges whether or not it is probable that each of the acquired partial character strings is inputted first at a time of inputting the kana character string. At this time, whether or not it is probable that each of the acquired partial character strings is inputted first may be judged on the basis of statistical data of each partial character string, or on the basis of a predetermined rule.

Afterward, on the basis of the judgment result, the index structure constructing unit 31 constructs index structure in which a kana-reading of the partial character string is defined as a key. Specifically, the index structure constructing unit 31 constructs the try tree so that the kana-reading of the partial character string, which is judged to have the probability of being inputted first, may be positioned at an upper layer. The constructed try tree is stored by the index structure storing unit 13.

Moreover, in the second exemplary embodiment, the index structure constructing unit 31 can set a score to each candidate for the character string to be suggested so that the score may become high as appearance frequency in a set of documents including each candidate becomes high. Then, according to the aspect, in the case that there are a plurality of the character strings to be suggested, the suggested candidate presenting unit 12 sets an order of priority to each character string to be suggested on the basis of the score, and presents each character string as the suggested candidate in the order of priority.

Here, a function of the index structure constructing unit 31 will be explained more specifically with reference to FIG. 8. FIG. 8 is a diagram showing an example of the dictionary which is used for constructing the index structure in the second exemplary embodiment of the present invention.

Firstly, it is assumed that a list of candidates for the character string to be suggested is given through the computer 20. For example, it is assumed that the character strings of 'Afghan', 'NEC中研', '球菌性中毒', 'アトピーに効く豆乳' and '香水用アトマイザー', which are mentioned in the first exemplary embodiment, are recorded in the list. As mentioned above, these character strings can be acquired from the input log, the product catalog, the address book, or the like which has been stored by the search system.

By use of the dictionary shown in FIG. 8, the index structure constructing unit 31 divides each character string, which is recorded in the list, into a plurality of partial character strings, and estimates a kana-reading of each partial character string by use of the kana-readings which are recorded in the dictionary. As shown in FIG. 8, the word and its kana-reading are associated each other and the association is recorded in the dictionary. Moreover, not only a word which is understandable by itself but also a word (incomplete word) which is generated by dividing the word understandable by itself are recorded in the dictionary. Therefore, it is expected to improve accuracy in estimating the kana-reading.

For example, it is assumed that the character string of 'NEC中研' is recorded in the list. In the character string, 'NEC' is a name of company, and '中研' is an abbreviation of '中央研究所' and is used in the company. That is, both words are not general words. Accordingly, there is a high probability that the both words are not recorded in a general Japanese language dictionary. As a result, in the case of carrying out the division by use of the general Japanese language dictionary, a situation that it is impossible to estimate the kana-reading is caused, and consequently a situation that 'NEC 中研' is not recorded in the index structure storing unit 13 as the character string to be suggested is caused. As mentioned above, in order to avoid the above-mentioned situations, also the incomplete word is recorded in the dictionary in the second exemplary embodiment.

The word and its kana-reading are associated each other and the association is recorded in the dictionary shown in FIG. 8 like 'N (kana-reading: エヌ)', 'E (kana-reading: イー)', 'C (kana-reading: シー)', '中 (kana-reading: チュウ)' and '研 (kana-reading: ケン)'. Accordingly, it is possible to estimate the kana-reading of the word which is not general like 'NEC 中研', and the not-general word and its kana-reading are recorded by the index structure storing unit 13.

Moreover, in the second exemplary embodiment, the word which is recorded in the dictionary may be composed of only one character or may be composed of plural characters. Furthermore, the word which is recorded in the dictionary may be each of syllables into which a word in English is divided. For example, the word which is recorded in the dictionary may be each of 'Af' (kana-reading: アフ)' and 'ghan (kana-reading: ガン)' which are generated by dividing 'Afghan (kana-reading: アフガン)'.

Moreover, as shown in FIG. 8, an item of 'Long content word' is set in the third column of the dictionary from the left. By use of the mark '○' or '×', the item indicates whether or not each word is composed of characters whose number is equal to or larger than a predetermined number (for example, 2). In the case that the word is composed of characters whose number is equal to or larger than the predetermined number, the mark '○' is written in the item, and in the case that the word is composed of characters whose number is equal to or smaller than the predetermined number, the mark '×' is written in the item. Here, in the case that the word is composed of characters whose number is equal to the predetermined number, whether the mark '○' or '×' is written in the item is within discretion of a designer. Here, since a word including many characters is apt to be inputted first at the time of inputting, information recorded in the item of 'Long content word' may be used in a process of judging 'whether or not it is probable to be inputted first'. Here, the process will be mentioned later.

Furthermore, in the example shown in FIG. 8, 'A part of speech' of each word may be recorded in the dictionary as shown in a fourth column of the dictionary from the left. Moreover, information which indicates a kind of character such as the hiragana and the kanji may be recorded as shown in a fifth column from the left.

Then, in the case that the character string of 'NEC中研' is recorded in the list, as mentioned above, the index structure constructing unit 31 divides the character string into five partial character strings by use of 'N', 'E', 'C', '中' and '研' which are recorded in the dictionary shown in FIG. 8. Moreover, in the case that the character string of '球菌性中毒' is recorded in the list, the index structure constructing unit 31 divides the character string into four partial character strings by use of '球', '菌', '性', and '中毒' which are recorded in the dictionary shown in FIG. 8. Moreover, in the case that the character string of 'Afghan' is recorded in the list, the index structure constructing unit 31 divides the character string into two partial character strings by use of 'Af' and 'ghan' which are recorded in the dictionary shown in FIG. 8.

Moreover, in the second exemplary embodiment, the Viterbi algorithm or the like, which is conventionally used in a filed of the morphemic analysis, can be used in the process of dividing the character string into the partial character strings. Moreover, in the division process, normalization of the character string such as conversion of the single-space character into the full-size character may be carried out.

Next, the index structure constructing unit 31 judges whether or not it is probable that each partial character string is inputted first at the time of inputting the kana character string. In this case, the index structure constructing unit 31 can judge the probability, for example, on the basis of statistical data of the partial character string.

For example, if the candidate for the character string to be suggested is acquired from the past input log which the search system accumulates, the index structure constructing unit 31 uses appearance frequency of the input log including the partial character string, which is a subject for the judgment process, as the statistical data. In this case, firstly, the index structure constructing unit 31 generates a character string by concatenating the partial character string, which is the subject of the judgment process, with a character string which follows the partial character string. A character string which includes a head character to a N'th character of the generated character string is a subject of measurement. If the following character string does not exist, a character string which includes a head character to a N'th character of the partial character string is the subject of measurement.

Then, the index structure constructing unit 31 measures the appearance frequency of the character string, which is the subject of measurement, in the past input logs which the search system accumulates, and judges that it is probable that the partial character string is inputted first when the measured appearance frequency is higher than a predetermined level. For example, in the case that N is 2, when there are many input logs whose head word is '中 毒' and there are few input logs whose head word is '菌性', it is judged that it is probable that a partial character string whose head word is '中毒' is inputted first, and it is judged that it is not probable that a partial character string whose head word is '菌性' is inputted first.

Moreover, the index structure constructing unit 31 can set a score, which expresses aptness to be inputted first, to each candidate for the character string to be suggested by use of the measured appearance frequency. In this case, similarly to the first exemplary embodiment, when there are a plurality of the character strings to be suggested, the suggested candidate presenting unit 12 can set an order of priority to each character string on the basis of the score, and can present each character string as the suggested candidate in the order of priority.

Moreover, the statistical data may be acquired from text data other than the input log, for example, from a Web page. Specifically, by using a comma and a period or by use of the morphemic analysis, the index structure constructing unit 31 firstly divides text data into a sentence, a clause or a word.

Next, when the division is completed, the index structure constructing unit 31 generates a character string by concatenating the partial character string, which is the subject of the judgment process, with a character string which follows the partial character string. Then, the index structure constructing unit 31 measures number of times when a character string including a head character to a N'th character of the generated character string is used at a head of the sentence, the clause or the word, and judges that it is probable that the partial character string is inputted first when the measured number of times is higher than a predetermined number. If the following character string does not exist, a character string which includes a head character to a N'th character of the partial character string is the subject of measurement.

Moreover, the judgment process carried out by the index structure constructing unit 31 may be carried out on the basis of a predetermined rule. Or, a combination of plural rules may be used. For example, there is a case that, in a document, there is a switch point where a kind of character switches like a switch point where a kind of character switches from the kanji to the alphabet, or the like. In this case, it is possible to judge that it is probable that a partial character string, which appears at the rear of the switch point, is inputted first. By prescribing the above as a rule, it is possible to carry out the above-mentioned judgment process.

Moreover, the judgment process can be carried out by setting a content word to the dictionary in advance. For example, the judgment process may be carried out on the basis of the marks 'o: long' and 'x: short' which are written in the item of 'Long content word'. In this case, it is judged that it is probable that a partial character string, whose head portion is identical with the long content word, is inputted first. Furthermore, the judgment process can be carried out on the basis of the part of speech of the word which is recorded in the dictionary. For example, by judging that it is probable that Noun and Verb are inputted first and it is not probable that Postpositional particle and Modal verb are inputted first, the judgment process may be carried out.

Specifically, by carrying out any one of the above-mentioned judgment processes, the index structure constructing unit 31 judges that, for example, in the case of the character string of 'NEC中研', it is probable that 'N' and '中' are inputted first, and it is not probable that 'E', 'C' and '研' are inputted first.

Then, similarly to the first exemplary embodiment, the index structure constructing unit 31 constructs the index structure by defining a kana-reading of the partial character string, which is judged to have the probability of being inputted first, as a key. For example, in the example of 'NEC中研', the index structure constructing unit 31 constructs a path in which 'エヌ' (N) is at an upper layer position, and a path in which 'チュウ' (中) is at an upper layer position. Moreover, the index structure constructing unit 31 connects 'イー' (E: ー is macron for イ ), 'シー' (C), 'シー' (中) and 'ケン' (研), which follow 'エヌ', with 'エヌ' in this order in the path in which 'エヌ' is at the upper position, and connects 'ケン' with 'チュ ウ' in the path in which 'チュウ' is at the upper position.

In the case that the user inputs 'エヌイー' or 'チュウケ', 'NEC 中研' is suggested by using the index structure which is constructed as mentioned above. However, in the case that the user inputs 'イーシー' or the like, since it is judged that it is not probable that the kana character string is inputted first, 'NEC中研' is not suggested Moreover, the index structure constructing unit 31 can record a segment, which clearly indicates a boundary between the partial character strings in order to identify each partial character string acquired by the division by use of the dictionary, in the index structure. As mentioned in the first exemplary embodiment, the segment is useful in the case that the character string determining unit 11 generates information indicating which portion is related to the inputted kana character string, and the segment makes realization of the highlight display or the like easy.

[Operation of Device]

Next, an operation of the input assistance device 30 in the second exemplary embodiment of the present invention will be explained with reference to FIG. 9. FIG. 9 is a flow diagram showing the operation of the input assistance device in the second exemplary embodiment of the present invention. In the following explanation, FIG. 7 and FIG. 8 are taken into consideration.

Moreover, in the second exemplary embodiment, by making the input assistance device 30 operate, an input assistance method is carried out. Accordingly, to explain the input assistance method in the second exemplary embodiment is also to explain the operation of the input assistance device 30 which will be shown in the following. Here, since a process other than the construction process of the index structure is the same as one in the first exemplary embodiment, the construction process of the index structure will be explained in the following.

Figure 9:
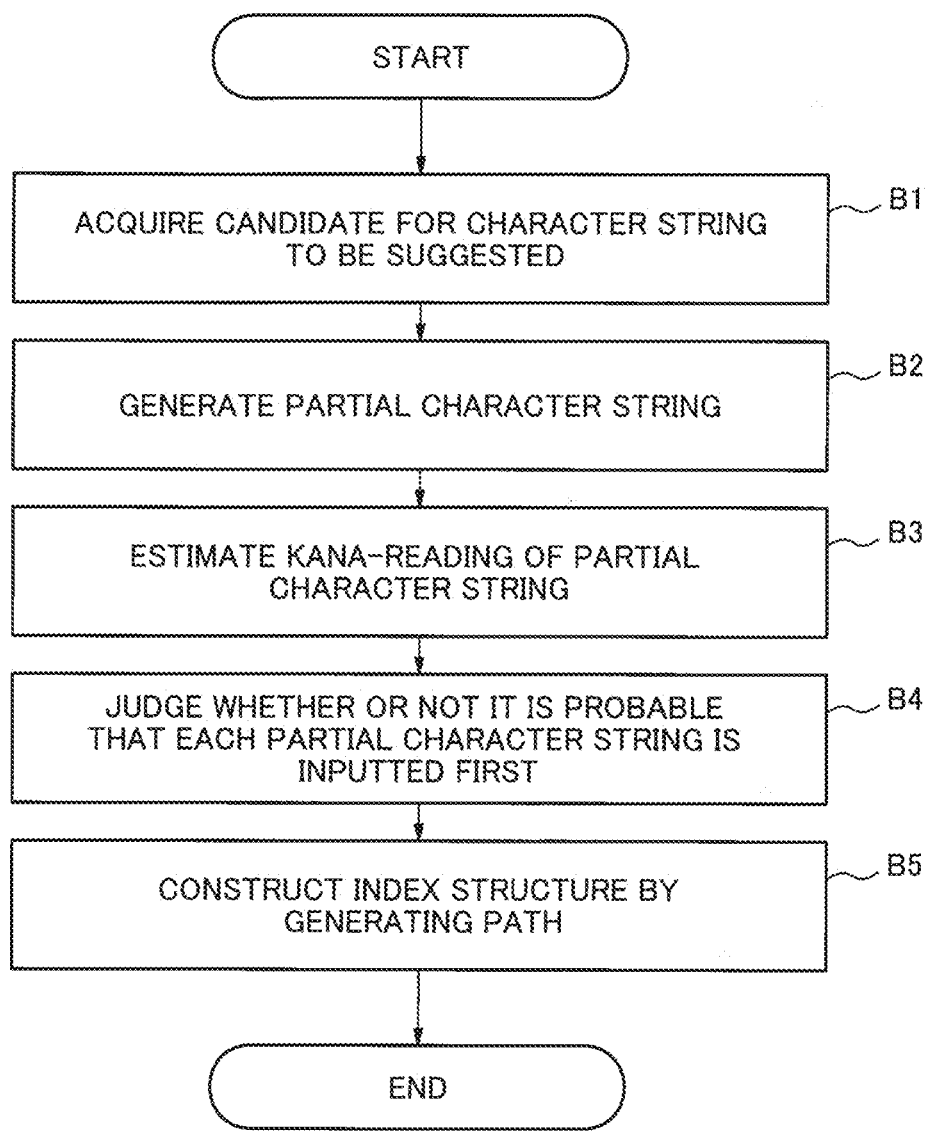
FIG. 9 is a flow diagram showing an operation of the input assistance device in the second exemplary embodiment of the present invention.

As shown in FIG. 9, the index structure constructing unit 31 firstly acquires the candidate for the character string to be suggested (Step B1). Specifically, the candidate is acquired from an input log, a product catalog, an address book, or the like which has been stored by a search system.

Next, by use of the dictionary show in FIG. 8, the index structure constructing unit 3 divides each character string, which is recorded in the list, into a plurality of partial character strings and generates the partial character strings (Step B2). Next, by using the kana-reading which is recorded in the dictionary, the index structure constructing unit 31 estimates the kana-reading of each partial character string which is generated in Step B2 (Step B3).

Next, the index structure constructing unit 3 judges whether or not it is probable that each character string is inputted first at the timing of inputting the kana character string (Step B4). The judgment process in Step B4 is carried out on the basis of statistical data, a predetermined rule, information recorded in the dictionary, or the like.

Afterward, by use of the judgment result in Step B4, the index structure constructing unit 31 constructs a plurality of paths so that the kana-reading of the partial character string, which is judged to have the probability of being inputted first, may be defined as the key, and then, similarly to the first exemplary embodiment, the index structure constructing unit 3 constructs the index structure (Step B5). The constructed index structure is stored by the index structure storing unit 13.

[Program]

Moreover, it is sufficient that a program in the second exemplary embodiment is a program which makes a computer carry out Steps A1 to A4 shown in FIG. 6, and Steps B1 to B5 shown in FIG. 9. By installing the program in the computer and executing the program, it is possible to realize the input assistance device 30 and the input assistance method in the second exemplary embodiment. In this case, CPU of the computer works as the character string determining unit 11, the suggested candidate presenting unit 12 and the index structure constructing unit 31 and carries out the processes of these units.

[Effect in Second Exemplary Embodiment]

As mentioned above, according to the second exemplary embodiment, the input assistance device 30 constructs the index structure by itself. As a result, a manager of the input assistance device 30 may merely input the input log, the product catalog, the address book or the like, which has been stored by the search system, into the device. Moreover, also in the case of using the second exemplary embodiment, it is possible to acquire the effect which is mentioned in the first exemplary embodiment.

(Third Exemplary Embodiment)

Figure 11:
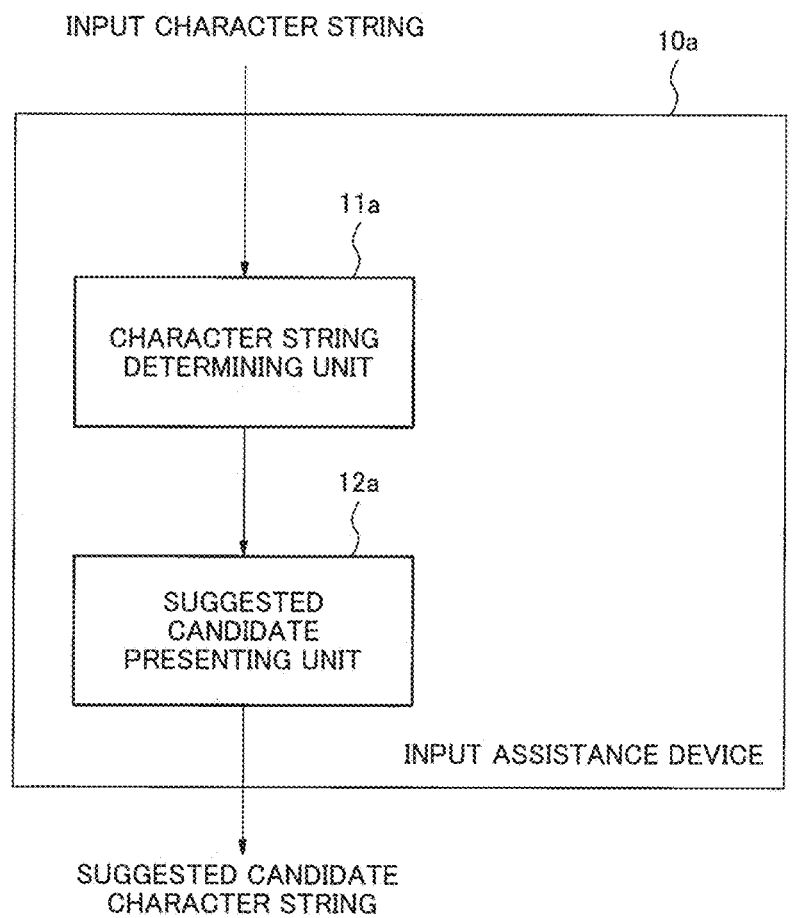
FIG. 11 is a block diagram showing a schematic configuration of an input assistance device in a third exemplary embodiment of the present invention.

Next, a configuration of an input assistance device in a third exemplary embodiment of the present invention will be explained. FIG. 11 is a block diagram showing a schematic configuration of an input assistance device 10*a* in the third exemplary embodiment of the present invention. The input assistance device 10*a* in the third exemplary embodiment is a device for assisting a user to input a character string, and includes a character string determining unit 11*a* and a suggested candidate presenting unit 12*a*.

In the case that the user inputs a kana character string, the character string determining unit 11*a* determines a character string to be suggested, which is related to the inputted kana character string, by use of index structure in which a word and its kana-reading are recorded and which indicates whether or not it is probable that the word is inputted first at a time of inputting a character string. The suggested candidate presenting unit 12*a* presents the character string to be suggested, which is determined by the character string determining unit 11*a*, as a suggested candidate.

According to the third exemplary embodiment of the present invention, in consideration of the probability of being inputted first in the character string, the input assistance device suggests the character string to be suggested to the user. As a result, it is possible to carry out input assistance with high accuracy in suggestion.

Figure 10:
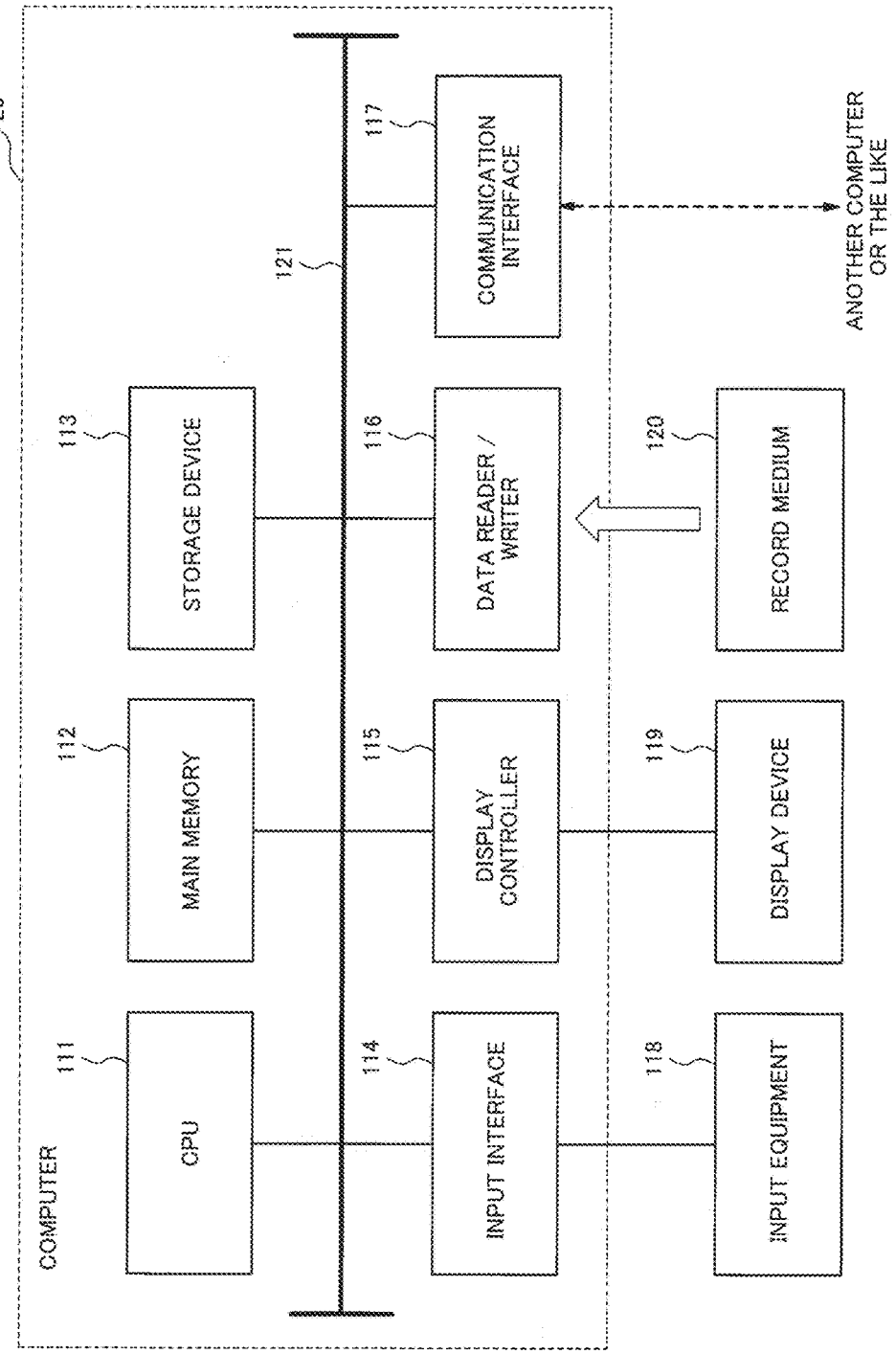
FIG. 10 is a block diagram showing an example of a computer which realizes the input assistance devices in the first and the second exemplary embodiments of the present invention.

Here, a computer, which realizes the input assistance device by carrying out the programs in the first to the third exemplary embodiments mentioned above, will be explained with reference to FIG. 10. FIG. 10 is a block diagram showing an example of the computer which realizes the input assistance devices in the first and the second exemplary embodiments of the present invention.

As shown in FIG. 10, a computer 20 includes CPU 111, a main memory 112, a storage device 113, an input interface 114, a display controller 115, a data reader/writer 116 and a communication interface 117. The above-mentioned units are connected each other through a bus 121 so as to be able to carry out data communication.

CPU 111 expands the program (code) in the present exemplary embodiment, which is stored by the storage device 113, to the main memory 112, and carries out various calculations by executing the program in a predetermined order. The main memory 112 is a volatile storage device such as DRAM (Dynamic Random Access Memory) or the like as a typical example. Moreover, the program in the present exemplary embodiment is provided in a state stored by a computer-readable record medium 120. Here, the program in the present exemplary embodiment may be a program which circulates on the Internet with which the computer 20 is connected through the communication interface 117.

Moreover, as a specific example of the storage device 113, a semiconductor storage device such as a flash memory or the like is exemplified in addition to a hard disk. The input interface 114 mediates data transmission between CPU 111 and an input equipment 118 such as a key board and a mouse. The display controller 115 is connected with a display device 119 and controls display which is carried out by the display device 119.

The data reader/writer 116 mediates data transmission between CPU 111 and the record medium 120. That is, the data reader/writer 116 reads the program from the record medium 120, and writes a process result provided by the computer 20 into the record medium 120. The communication interface 117 mediates data transmission between CPU 111 and another computer.

Moreover, as a specific example of the record medium 120, a general semiconductor storage device such as CF (Compact Flash), SD (Secure Digital) or the like, a magnetic storage medium such as Flexible Disk or the like or an optical storage medium such as CD-ROM (Compact Disk Read Only Memory)or the like is exemplified.

Here, a computer which realizes the input assistance devices in the first to the third exemplary embodiments is not limited to the computer shown in FIG. 10. The computer which realizes the input assistance devices in the first to the third exemplary embodiments may be a computer, which requires an input operation carried out by the user, such as a personal computer, Smartphone, a tablet type terminal device, a car navigation system or the like.

INDUSTRIAL APPLICABILITY

As mentioned above, according to the present invention, it is possible to present the character string to be suggested to the user in consideration of the probability of being inputted first in the character string. The present invention is useful in a field requiring the input operation carried out by the user, for example, a search system, a word processor, or the like The present invention has been explained by explaining the above-mentioned exemplary embodiments as preferable examples. However, the present invention is not limited to the above-mentioned exemplary embodiments. That is, the present invention can apply various aspects, which a person skilled in the art can understand, within the scope of the present invention.

This application is based upon and claims the benefit of priority from Japanese Patent Application No. 2013-243128, filed on Nov. 25, 2013, the disclosure of which is incorporated herein in its entirety by reference.

REFERENCE SIGNS LIST 10 input assistance device
11 character string determining unit
12 suggested candidate presenting unit
13 index structure storing unit
20 computer
21 input unit
22 display unit
30 input assistance device
31 index structure constructing unit
111 CPU
112 main memory
113 storage device
114 input interface
115 display controller
116 data reader/writer
117 communication interface
118 input equipment
119 display device
120 record medium
121 bus

What is claimed is:

1. An input assistance device for assisting English character input by a user, comprising:
an index structure storage that stores at least
sets of information, wherein each set of the sets associate a kana-reading of an English word, in which a character string to be recommended to the user is divided, with a mark indicating whether or not the English word is likely to be firstly inputted at the time of the English character input;
character strings to be recommended to the user; and
an index structure that registers kana-readings of the character strings to be recommended to the user;
one or more processors configured as a character string determining unit that determines a character string which includes a word of the sets to be suggested to the user, in a case that
one or more English characters inputted by the user matches at least a part of a kana-reading of a character string to be recommended to the user stored in the index structure storage;
the part matching is the kana-reading of the English word of the sets; and
the mark relating to the word of the sets indicates the word of the sets is likely to be firstly inputted at the time of the English character input, and
the one or more processors are further configured as a suggested candidate presenting unit that presents the character string to be suggested, which is determined, as a suggested candidate.

2. The input assistance device according to claim 1, wherein the character string determining unit determines the character string which includes the word of the sets to be suggested to the user, in a case that
the one or more English characters inputted by the user matches at least a head portion of the kana-reading of the character string to be recommended to the user stored in the index structure storage, the part is the kana-reading of the English word of the sets, and
the mark relating to the word of the sets indicates the word of the sets is likely to be firstly inputted at the time of the English character input, furthermore,
the character string determining unit determines a character string, which includes concatenating plural and consecutive words of the sets to be suggested to the user, in a case that
the one or more English characters inputted by the user matches at least a head portion of a kana-reading of the concatenating plural and consecutive words of the sets in the character string to be suggested to the users, and
the mark relating to the head portion of the words of the sets indicates the head portion is likely to be firstly inputted at the time of the English character input.

3. The input assistance device according to claim 1, wherein the one or more processors are further configured as an index structure constructing unit that divides a candidate for the character string to be suggested into a plurality of partial character strings, by use of a dictionary in which description of the English word and a kana-reading of the English word are associated with each other, judges whether or not it is probable that the partial character string is inputted first at the time of inputting the character string, per the partial character string out of the plural character strings, and constructs the index structure, in which a kana-reading of the partial character string is defined as a key, based on a result of the judge.

4. The input assistance device according to claim 3, wherein on the basis of statistical data of the partial character string, the index structure constructing unit judges whether or not it is probable that the partial character string is inputted first at the time of inputting the character string.

5. The input assistance device according to claim 3, wherein on the basis of a predetermined rule, the index structure constructing unit judges whether or not it is probable that the partial character string is inputted first at the time of inputting the character string.

6. The input assistance device according to claim 4, wherein the index structure constructing unit further sets a score to each of the candidates for the character string to be suggested, based on the statistical data, and the suggested candidate presenting unit sets a priority order to each of the character strings to be suggested on the basis of the score, and presents the character strings as the suggested candidate in the priority order, in the case that there are a plurality of the character strings to be suggested which are determined.

7. The input assistance device according to claim 1, wherein the suggested candidate presenting unit presents a portion, which is included by the character string to be suggested that is determined and which is related to the inputted character string, in a form different from another portion form.

8. An input assistance method for assisting English character input by a user by use of a computer, the method comprising:
 storing, with an index structure storage, at least
  sets of information, wherein each set of the sets associate a kana-reading of English word, in which a character string to be recommended to the user is divided, with a mark indicating whether or not the word is likely to be firstly inputted at the time of the character input;
  character strings to be recommended to the user; and
  an index structure that registers kana-readings of the character strings to be recommended to the user;
 determining, with one or more processors, a character string which includes a word of the sets to be suggested to the user, in a case that
  one or more English characters inputted by the user matches at least a part of a kana-reading of a character string to be recommended to the user stored in the index structure storage;
  the part matching is the kana-reading of the word of the sets; and
  the mark relating to the word of the sets indicates the word of the sets is likely to be firstly inputted at the time of the character input, and
 presenting, with the one or more processors, the character string to be suggested, which is determined, as a suggested candidate.

9. The input assistance method according to claim 8, wherein in the determining, determining a character string, which includes the word of the sets to be suggested to the user, in a case that
 the one or more English characters inputted by the user matches at least a head portion of the kana-reading of the character string to be recommended to the user stored in the index structure storage, the part is the kana-reading of the English word of the sets, and
 the mark relating to the English word of the sets indicates the English word of the sets is likely to be firstly inputted at the time of the English character input, furthermore,
in the determining, determining the character string, which includes concatenating plural and consecutive English words of the sets to be suggested to the user, in a case that
 the one or more English characters inputted by the user matches at least a head portion of a kana-reading of the concatenating plural and consecutive words of the sets in the character string to be suggested to the users, and
 the mark relating to the head portion of the words of the sets indicates the head portion is likely to be firstly inputted at the time of the English character input.

10. The input assistance method according to claim 8, further comprising processing of constructing an index structure, wherein dividing a candidate for the character string to be suggested into a plurality of partial character strings, by use of a dictionary in which description of the English word and a kana-reading of the English word are associated with each other, judging whether or not it is probable that the partial character string is inputted first at the time of inputting the character string, per the partial character string out of the plural character strings, and constructing the index structure, in which a kana-reading of the partial character string is defined as a key, based on a result of the judge.

11. The input assistance method according to claim 10, wherein in the constructing, judging whether or not it is probable that the partial character string is inputted first at the time of inputting the character string based on statistical data of the partial character string.

12. The input assistance method according to claim 10, wherein in the constructing, based on a predetermined rule, judging whether or not it is probable that the partial character string is inputted first at the time of inputting the character string.

13. A non-transitory computer readable storage medium for storing a program to assist English character input by a user by a computer, the program cause the computer implement for:
 storing, with an index structure storage, at least
  sets of information, wherein each set of the sets associate a kana-reading of an English word, in which a character string to be recommended to the user is divided, with a mark indicating whether or not the word is likely to be firstly inputted at the time of the character input;
  character strings to be recommended to the user; and
  an index structure that registers kana-readings of the character strings to be recommended to the user;
 determining, with one or more processors, a character string which includes a word of the sets to be suggested to the user, in a case that
  one or more English characters inputted by the user matches at least a part of a kana-reading of a character string to be recommended to the user stored in the index structure storage;
  the part matching is the kana-reading of the English word of the sets; and
  the mark relating to the word of the sets indicates the word of the sets is likely to be firstly inputted at the time of the character input, and
 presenting the character string to be suggested, which is determined, as a suggested candidate.

14. The storage medium according to claim 13, wherein in the determining, determining a character string, which includes the word of the sets to be suggested to the user, in a case that the one or more English characters inputted by the user matches at least a head portion of the kana-reading of the character string to be recommended to the user stored in the index structure storage, the part is the kana-reading of the English word of the sets, and the mark relating to the English word of the sets indicates the English word of the sets is likely to be firstly inputted at the time of the English character input, furthermore, in the determining, determining the character string, which includes concatenating plural and consecutive English words of the sets to be suggested to the user, in a case that the one or more English characters inputted by the user matches at least a head portion of a kana-reading of the concatenating plural and consecutive words of the sets in the character string to be suggested to the users, and the mark relating to the head portion of the words of the sets indicates the head portion is likely to be firstly inputted at the time of the English character input.

15. storage medium according to claim 13, further comprising processing of constructing an index structure, wherein dividing a candidate for the character string to be suggested into a plurality of partial character strings, by use of a dictionary in which description of the English word and a kana-reading of the English word are associated with each other, judging whether or not it is probable that the partial character string is inputted first at the time of inputting the character string, per the partial character string out of the plural character strings, and constructing the index structure, in which a kana-reading of the partial character string is defined as a key, based on a result of the judge.

16. The storage medium according to claim 15, wherein in the constructing, judging whether or not it is probable that the partial character string is inputted first at the time of inputting the character string based on statistical data of the partial character string.

17. The storage medium according to claim 15, wherein in the constructing, based on a predetermined rule, judging whether or not it is probable that the partial character string is inputted first at the time of inputting the character string.

* * * * *